US009990182B2

(12) United States Patent
Misra et al.

(10) Patent No.: US 9,990,182 B2
(45) Date of Patent: Jun. 5, 2018

(54) COMPUTER PLATFORM FOR DEVELOPMENT AND DEPLOYMENT OF SENSOR-DRIVEN VEHICLE TELEMETRY APPLICATIONS AND SERVICES

(71) Applicant: Tata Consultancy Services Limited, Maharashtra (IN)

(72) Inventors: Prateep Misra, West Bengal (IN); Arpan Pal, West Bengal (IN); Balamuralidhar Purushothaman, Bangalore (IN); Chirabrata Bhaumik, West Bengal (IN); Deepak Swamy, Austin, TX (US); Venkatramanan Siva Subrahmanian, College Park, MD (US); Avik Ghose, West Bengal (IN); Aniruddha Sinha, West Bengal (IN)

(73) Assignee: TATA CONSULTANCY SERVICES LIMITED (IN)

( * ) Notice: Subject to any disclaimer, the term of this patent is extended or adjusted under 35 U.S.C. 154(b) by 0 days. days.

(21) Appl. No.: 14/345,545

(22) PCT Filed: Sep. 18, 2012

(86) PCT No.: PCT/IN2012/000624
§ 371 (c)(1),
(2) Date: Mar. 18, 2014

(87) PCT Pub. No.: WO2013/072926
PCT Pub. Date: May 23, 2013

(65) Prior Publication Data
US 2014/0380264 A1 Dec. 25, 2014

(30) Foreign Application Priority Data

Sep. 19, 2011 (IN) .......................... 2651/MUM/2011

(51) Int. Cl.
*G06F 9/44* (2018.01)
*G06F 9/445* (2018.01)
(Continued)

(52) U.S. Cl.
CPC .................. *G06F 8/00* (2013.01); *G06F 8/36* (2013.01); *G06F 8/60* (2013.01); *G06F 11/3668* (2013.01);
(Continued)

(58) Field of Classification Search
CPC ..... G06F 8/00; G06F 8/36; G06F 8/60; G06F 11/3668; H04L 41/00; H04L 41/04;
(Continued)

(56) References Cited

U.S. PATENT DOCUMENTS 5,276,620 A * 1/1994 Bottesch .................. 701/41
6,338,001 B1 1/2002 Furst et al.
(Continued)

*Primary Examiner* — Li B. Zhen
*Assistant Examiner* — Sen Thong Chen
(74) *Attorney, Agent, or Firm* — Hayes Soloway P.C.

(57) ABSTRACT

A computing platform for intelligent development, deployment and management of vehicle telemetry applications is disclosed herein. Further, the present disclosure provides a method and system that enables provision of Intelligent Transportation Service on the Cloud-based Platform that facilitates creation and deployment of vehicle telemetry applications configured for enabling traffic measurements, traffic shaping, vehicle surveillance and other vehicle related services.

18 Claims, 3 Drawing Sheets

(52) U.S. Cl.
CPC .............. *H04L 41/00* (2013.01); *H04L 41/04* (2013.01); *H04L 41/5096* (2013.01); *H04L 43/00* (2013.01); *H04L 67/10* (2013.01); *H04L 67/12* (2013.01)

(58) Field of Classification Search
CPC ..... H04L 41/5096; H04L 43/00; H04L 67/10; H04L 67/12
USPC ......................................................... 717/100
See application file for complete search history.

(56) References Cited

U.S. PATENT DOCUMENTS

| | | | |
|---|---|---|---|
| 6,338,011 B1* | 1/2002 | Furst et al. ...................... | 701/1 |
| 7,869,425 B2 | 1/2011 | Elliott et al. | |
| 7,887,089 B2* | 2/2011 | Breed et al. ................... | 280/735 |
| 7,904,209 B2* | 3/2011 | Podgorny et al. ............ | 700/276 |
| 7,983,835 B2 | 7/2011 | Lagassey et al. | |
| 8,319,666 B2 | 11/2012 | Weinmann et al. | |
| 8,572,735 B2 | 10/2013 | Ghosh et al. | |
| 2005/0108504 A1 | 5/2005 | Cowin et al. | |
| 2006/0190285 A1* | 8/2006 | Harris et al. ...................... | 705/1 |
| 2009/0044265 A1* | 2/2009 | Ghosh et al. ................... | 726/14 |
| 2010/0000810 A1* | 1/2010 | Fernandez ................. | 180/65.31 |
| 2010/0082702 A1* | 4/2010 | Ramanathan et al. ........ | 707/803 |
| 2010/0214411 A1* | 8/2010 | Weinmann et al. ........... | 348/148 |
| 2011/0288684 A1* | 11/2011 | Farlow ................... | B25J 11/009 700/264 |
| 2013/0031567 A1* | 1/2013 | Nano ................. | G05B 23/0264 719/318 |

\* cited by examiner

COMPUTER PLATFORM FOR
DEVELOPMENT AND DEPLOYMENT OF
SENSOR-DRIVEN VEHICLE TELEMETRY
APPLICATIONS AND SERVICES

CROSS-REFERENCE TO RELATED
APPLICATIONS AND PRIORITY

The present application claims the benefit of Indian Patent Application. No. 2651/MUM/2011, filed Sep. 19, 2011, the entire disclosure of which is incorporated herein by reference.

TECHNICAL FIELD

The disclosure generally relates to the field of smart ubiquitous computing systems, cyber-physical systems and the Internet-of-Things (IoT). More particularly, the disclosure relates to a method and system for enabling a unified platform capable of providing suite of services for development and deployment of sensor-driven vehicular telemetry applications in the smart ubiquitous transportation environment.

BACKGROUND

In general, intelligent vehicular transportation includes remote monitoring of vehicles, road conditions, remote vehicle surveillance, and driving conditions etc. using telematics and telemetry data analysis. Telematics has been widely implemented worldwide for analyzing data captured by various telecommunication devices on remote objects such as vehicles. For example, by utilizing telematics in combination with the deployed GPS (Global Positioning System) device in a vehicle, it is possible to track the exact location of the vehicle. Similarly, telematics helps in trailer tracking and fleet management of vehicles. Telematics involve various telecommunication and sensing devices integrated in a vehicle under the control of the vehicle. In contrast to telematics, telemetry is the process of measuring parameters from the location of source to the location of computational and analytics performing the task of analysis of the measured parameters without affecting the control on the objects in the vehicle. The analytics platform itself may be in the vehicle or at a remote location such as in a "cloud", or split in some way across the two.

In the background art, various vehicular applications are provided on either the Smartphones of the end-users subscribed to these applications or on the telematics platforms. However, all these vehicular application is unique of its kind and meant for specific activity monitoring. These are limited to providing specific applications deployed on Smartphone or any telematics platform with or without the usage of a back end server. Each of this applications act as a standalone application that can be deployed on user's Smartphone and will track a dedicated/specific activity in the smart-vehicle environment. However, these applications can be leveraged to develop and deploy various other applications in context with the vehicular domain by using the algorithms and the software development logic on the basis of which each standalone application is developed. More particularly, each of These applications can be provided as various services in the platform based Intelligent Transportation system that facilitates development, testing and deploy of numerous applications by means of data and system components reusability.

Thus, in view of the above, there is a long-felt need in the industry to address the aforementioned deficiencies and inadequacies.

SUMMARY OF THE DISCLOSURE

Before the present methods, systems, and hardware enablement are described, it is to be understood that this disclosure is not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

Embodiments of the present disclosure provide an intelligent transportation system. Briefly described, in architecture, one embodiment of the system, among others, can be implemented as follows. An infrastructure platform comprises plurality of hardware and software components, infrastructure services, a plurality of Application Program Interfaces (APIs), and a plurality of Software Development Kits (SDKs). A plurality of sensors is intermittently connected with the infrastructure platform with at least one communication network. A vehicle telemetry application development device is electronically coupled with the infrastructure platform and the plurality of sensors, wherein said vehicle telemetry application development device is facilitated using a service-oriented architecture (SOA) allowing application development and deployment of the vehicle telemetry application development device using data and infrastructure reusability.

The present disclosure can also be viewed as providing a method for providing an intelligent transportation platform. In this regard, one embodiment of such a method, among others, can be broadly summarized by the following steps: integrating a suite of bundled services on the intelligent transportation platform capable of executing algorithms, functions and calls to develop a suite of sensor driven applications for sensor data feeds received from a plurality of sensors; enabling a plurality of application developers to flexibility select services and algorithms relevant in context with a domain of a sensor driven application within the suite of sensor driven applications; and configuring the intelligent transportation platform to enable the plurality of application developers to develop a plurality of new sensor driven applications and algorithms of the plurality of new sensor driven applications using at least one selected service from the suite of bundled services.

In one embodiment, the present disclosure provides an Intelligent Transportation system based cloud-computing platform that consist of a plurality of services over the platform. In this embodiment, sensor based analytics are provided as services on the platform which include feature extraction, classification, clustering and visualization. In this embodiment, these set of services are provided on the vehicular system and also on the user's Smartphone capable of providing sensor data feeds to the platform. These services include accelerometer analytics, location based services and other such tools for developing applications. The services include bundles for feature extraction, classification and clustering along with visualization, reporting and actuation etc. In this embodiment, together these services form a bundle of intelligent transportation services deployed on the cloud-computing platform which is used to develop a number of novel applications and also provides a facilitator for developing further applications on the same domain.

In this embodiment, the intelligent transportation service (ITS) platform integrates a suite of services for enabling real-time sensor data-capture, storage, analytics, development and deployment of telemetry applications built using said services for data captured from any kind of sensor device. The platform enables availability and selection of relevant service from the suite of services bundled inside the platform to develop, test and deploy a sensor-based telemetry application that reports the subscribed computing devices the anomalies observed in the vicinity of the smart vehicular system and prognosis thereof. More particularly, in this embodiment of the disclosure, an intelligent transportation system is deployed using the suite of services that facilitates development and deployment of several vehicle telemetry applications that monitor and track anomalies in the vehicles, road conditions, driving habits of the driver, environmental conditions, and passenger behaviors etc. The platform further enables data reusability to configure the existing suite of services comprising algorithms such as feature extraction, clustering, and classification etc. to identify and built novel sensor-based applications.

In this embodiment, the ITS is configured to provide context-aware service to the end-consumers based on tracking of habits of the passengers in the vehicle. That is, the ITS platform is configured such that the multiple users in the vehicle premises may each automatically receive advertisements relevant to their interests, habits and behaviors tracked through various sensors deployed in the vehicle, generating the context. For example, if a user who typically sits in the passenger seat of the vehicle is interested in sports, he or she will be pushed advertisements related to various sports products such as shoes, jerseys, and sport equipment, etc. If the passenger in the back seat is interested in something else (e.g. action games), appropriate ads will be targeted to him at the same time the passenger seat occupant receives the sports ads.

A principle object of the disclosure is to provide a method and system enabling an intelligent transportation platform hosting a plurality of bundled services to develop sensor-driven vehicle telemetry applications.

Yet another object of the disclosure is to enable application developers select services and algorithms thereof relevance in context with the domain of the sensor driven application to be developed from the bundled services of the platform.

Yet another object of the disclosure is to provide test data and development sandboxes to application developers for testing the application developed and ready for deployment in the transportation domain.

Yet another object of the disclosure is to plug-in the newly developed applications into the bundled of services of the platform for facilitating future application development on same domain.

Yet another object of the disclosure is to provide a method and system wherein said developed sensor-based applications facilitates vehicle anomaly detection and prognosis thereof focused to enable safety and security for the vehicle, driver, passengers and other road users.

Yet another object of the disclosure is to enable a method and system for notifying the end-users' subscribed to said intelligent transportation systems' applications regarding the anomalies in the vehicle transit.

Still another object of the disclosure is to enable a method and system for delivery of targeted advertisements to the occupants of the vehicle based on real-time tracking of occupant behavior and driving habits.

BRIEF DESCRIPTION OF THE DRAWINGS

The foregoing summary, as well as the following detailed description of preferred embodiments, is better understood when read in conjunction with the appended drawings. For the purpose of illustrating the disclosure, there is shown in the drawings exemplary constructions of the disclosure; however, the disclosure is not limited to the specific methods and architecture disclosed in the drawings.

DETAILED DESCRIPTION

The description has been presented with reference to an exemplary embodiment of the disclosure. Persons skilled in the art and technology to which this disclosure pertains will appreciate that alterations and changes in the described method and system of operation can be practiced without meaningfully departing from the principle, spirit and scope of this disclosure.

In an aspect of the present disclosure, a suite of services are bundled on an intelligent cloud-computing platform such as Real-Time Platform for Services & Analytics (RIPSAC) in the form an intelligent transportation service based solution that is utilized for creating and deploying various vehicle telemetry applications in the smart vehicular environment. These intelligent transportation services on the RIPSAC platform can be utilized for real-time monitoring of various aspects related to vehicular transport including driving habits, traffic conditions, road conditions, passenger behaviors and location tracking etc. The intelligent transportation system is enabled by using few set of services suite bundled in the RIPSAC platform. RIPSAC acts as a unified platform which provides Intelligent Transportation based Services that allows the deployment of applications as well as reusable algorithms and components into the platform. Various embodiments of the inventive intelligent transportation system are now described by referring to FIGS. 1, 2 and 3.

Figure 1:
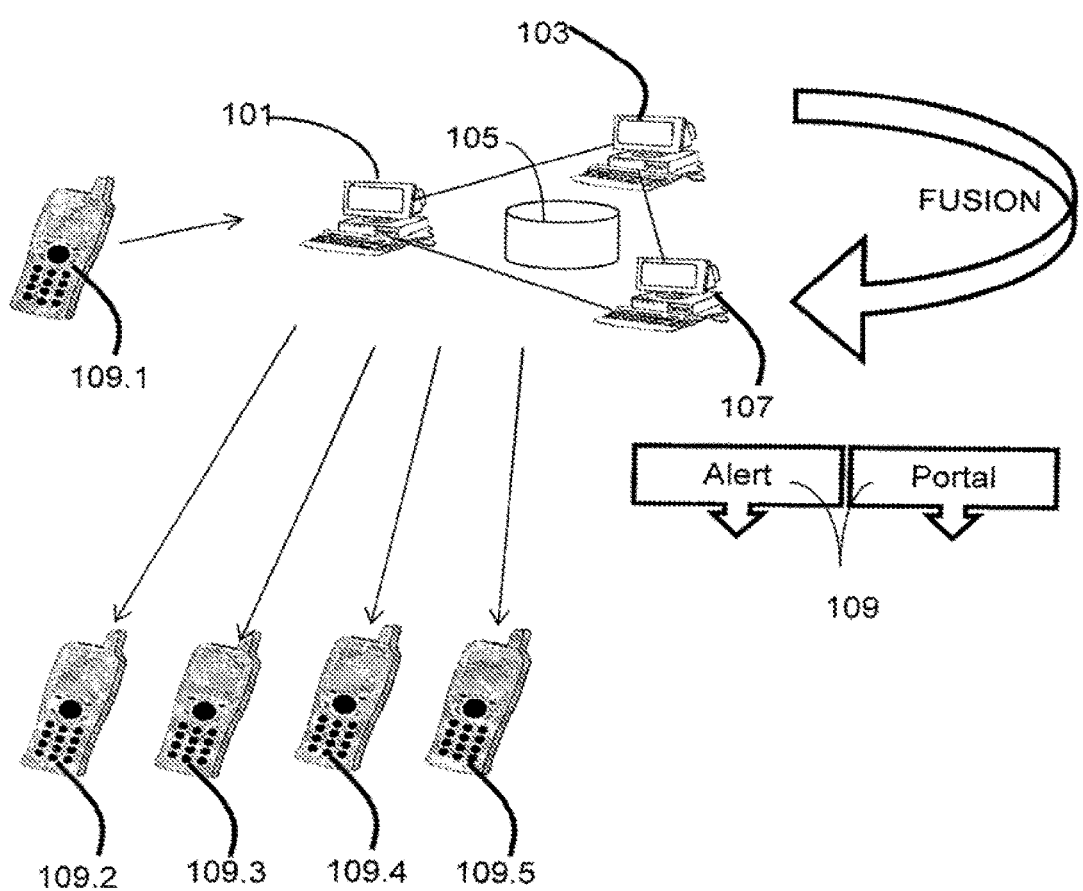
FIG. 1 is a block diagram illustrating an intelligent transportation system (100), deployed using suite of services bundled on a cloud-computing platform according to an embodiment of the disclosure.

Referring to FIG. 1 is a block diagram illustrating an intelligent transportation system (100), hereinafter referred to as ITS deployed using suite of services bundled on the RIPSAC platform. As illustrated, the intelligent transportation system (100) is adapted to configure a sensing service module (101), an edge analytics service module (103), a backend storage service module (105), a backend analytics service module (107) and a reporting service module(109) to intelligently manage and deploy various sensor-based applications for transportation systems.

In an embodiment, the sensing service module (101) is configured to provide sensor data feeds either from a Smartphone or an in-car telematics platform equipped with an array of sensors either on board or connected via some bus/wireless interface. The edge analytics service module (103) performs analytics on the received data feeds from the sensor that enables preprocessing and feature extraction which leads to data reduction and also allows for storage of only features rather than raw sensor data. The Backend storage service module (105) is a SWE implementation which allows storage and retrieval of sensor data using SOS (Sensor Observation Service). The Backend analytics service module (107) is adapted for running analytics on the back-end subsystem that include execution of algorithms such as classification, clustering etc. The reporting/service module (109) is a user interface service module that provides audio/visual alerts or visualizations to the end-user subscribed devices (111) based on the analytics run on the sensor data. More particularly, the results of the analytics in the form of anomalies detected in the vehicular transport and prognosis thereof is transmitted on the end-user computing devices (111) subscribed to RIPSAC services and application developed therefrom. Thus, the present disclosure provides Intelligent Transportation as a Service bundle on top of a SWE (Sensor Web Enablement) based platform in the form of RIPSAC platform. The ITS (100) incorporates a suite of services focused on Safety and Security for the vehicle, driver, passengers and other road users. The ITS (100) allows application developers/tenants (113) to pick and choose from a set of algorithms best suited for the domain. The ITS (100) allows application developers to test their algorithms with some test data from the platform. The intelligent transportation system (ITS) built on RIPSAC is flexible to allow for development of new algorithms and adding them back on to the bundle and also allows application developers to test their algorithms with some test data from the platform.

In an embodiment, the sensing service module (101) supports various sensor services including location service, motion service, diagnostic service, and in-vehicle audio-visual sensing service that provides sensor data feeds from various on-board/off-board vehicle sensors. The Location service is configured to interpret the position of an entity or a device. In general, the location is defined by latitude, longitude and altitude information. In a local scenario, like in a building, the location might mean much more granular location like floors and zones etc. Location may be provided by GPS systems or may be derived from vicinity sensors like RFID tags, Bluetooth or Wi-Fi. The location may also be derived from a person's public information like twitter hash tags, Facebook location service of text analysis of blogs. Geo-tagging of pictures uploaded in near real-time by a user may also be used as inference.

In an embodiment, the motion service is provided from the vehicle as a set of raw or processed sensor outputs that depicts the motion parameters (typically velocity or acceleration) of a vehicle along the X, Y and Z axis using a set of pre-defined coordinate system. Motion is typically detected and estimated using accelerometer and optionally a compass as sensor. However it can also be inferred indirectly using emissive and beaming techniques from the infrastructure like once used by the police to detect speeding. However, use of the second form is rare and hence may be ignored. Further, motion can also be predicted using proximity sensing to other vehicles or infrastructure points along a route. The Diagnostics service is provided by the analytics on a connected dashboard of a vehicle. It includes analysis of fuel level, batteries, oxygen sensors, MPFI readings, and accelerometer etc. Diagnostics forms an important service because a lot of vehicle safety and reliability depends on the vehicle condition which can be obtained from diagnostics information. This information is available from most of the vehicles using the On-Board Diagnostic (OBD). In an embodiment, in-vehicle audio-visual sensing service provides audio signals and visuals (images/videos) from inside the car or around the car using Smartphone based camera or in-vehicle cameras connected to a gateway. Typical multimedia signal processing techniques can be used to extract useful information from this data like object identification or classification etc.

In an embodiment, the back-end analytics service module (107) supports various analytics services including accelerometer analytics service, location analytics service, multimedia signal processing service, and modeling/simulation service. In this embodiment, the accelerometer analytics service can be used for a variety of purposes such as bad trail detection, rouge driver identification and also diagnosing the condition of a vehicle. The accelerometer analytics service utilizes raw accelerometer data and executes algorithms such as Feature Extraction and Classification etc. to perform the analytics. The location analytics service suite implements clustering or classification of location that leads in aggregation of location based data to provide a much better insights or inferences to the responding devices. The location analytics service bundle contains a set of such algorithms that process the location data produced by sensors like GPS, A-GPS etc. to provide analytics like "who is nearer to whom" and "was it the same place".

In this embodiment, the multimedia signal processing service is an analytics service based on audio and video processing to provide driver assistance and vehicle monitoring utilities. This allows monitoring the driver behavior (e.g. sleep detection, attention detection etc.), alerts the driver in presence of pedestrians on the way and alerts the driver on road signs. The video processing services detect the pedestrians and their distances from the car, detect the road signs and detect the face and closure of eyes of the driver. Ways of localizing and tracking drowsiness state of the eyes of the driver by using images captured by near infrared (IR) camera disposed on the vehicle is known in the art, and may include various techniques utilized for detecting a driver falling asleep while driving The detected events and alerts are the output of this service In an embodiment, the modeling/simulation service bundle is configured to receive inputs from location, motion and diagnostic based services to model terrain or vehicle or even the driver. This provides a way to simulate the situation and generate synthetic data from training of the algorithms and system for the real runtime. Also this data can be used for future classification. In this embodiment, the reporting/service module (109) provides audio/visual alerts, reports for the transportation service requested by various subscribers. It may be navigation, diagnostic or road prognosis alert or a report on the car health or the driving patterns etc.

In an embodiment, the ITS uses a Planning Service suite on the RIPSAC that can provide users with a route plan using an existing transportation system and location information about the source, destination and a set of POI (places of interests). Further, the safety service on the RIPSAC is configured to use various sensor analytics service and alerting/reporting service to provide safety related alerts and actuations to the user. This includes image processing, diagnostic, location and motion services combined with several types of analytics run on the same, for example object detection and identification, accelerometer analytics and also readings from RPM and suspension sensors via OBDs of the vehicle.

Figure 2:
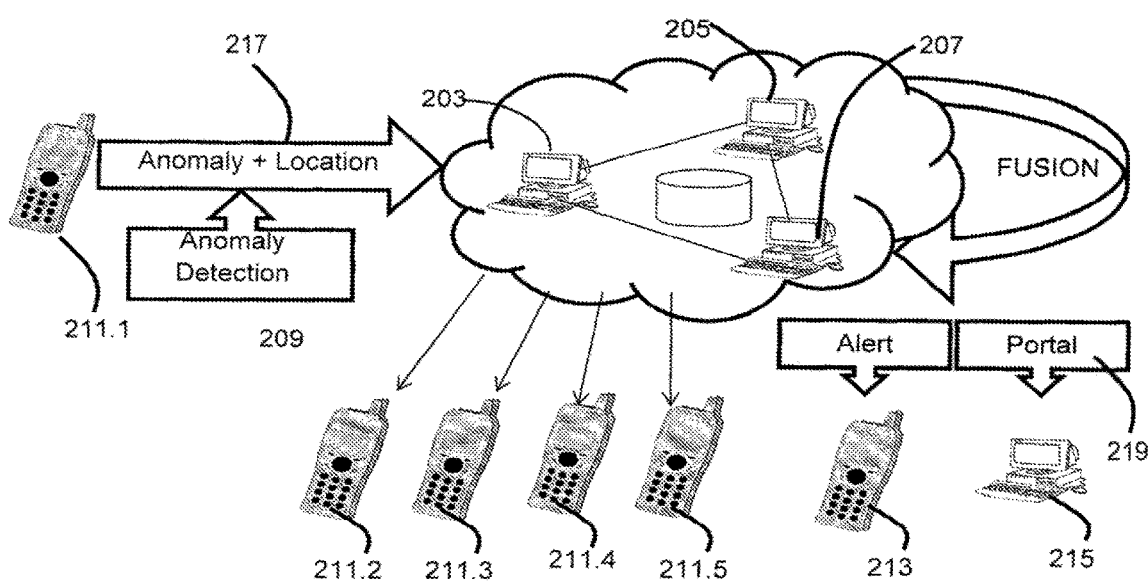
FIG. 2 is a working example illustrating road condition monitoring and alert application deployed by an Intelligent Transportation System using the platform services according to an exemplary embodiment of the disclosure.

Referring to FIG. 2 is a working example illustrating road condition monitoring and alert application deployed by the ITS using the RIPSAC services according to an exemplary embodiment of the disclosure. The working example illustrates the capability of the ITS (100) to detect and avoid potholes on the road. Potholes are both annoying as well as can be damaging to vehicles. However, potholes can be avoided and taken care of if the driver is made aware of their locations well in advance. To enables this, vehicles collaborative communicates with the ITS sensing and alert system. As illustrated, whenever a vehicle accelerometer (211.1) experiences an anomaly (209) in the z-axis, it uploads its location and the anomalous data (217) to the backend (200). The backend (200) does an analysis of the data from a number of such vehicles (211.2, 211.3, 211.4, and 211.5) and derive an inference that the detected location does contain a pothole. Following this, the vehicles (213, 215) which are on the same route are notified of the location and hence the pothole is successfully avoided.

In this exemplary embodiment, the road condition monitoring application is enabled using the suite service bundled in the RIPSAC for ITS. In the first step, sensor service for motion (203) is used to capture accelerometer readings from user's Smartphone (211.1). Following this, the analytics service (205) is used for preprocessing, feature extraction and classification of the data on user's Smartphone (211.1) to identify the current road condition. This is achieved as a score for each classifier. Then sensor service for location (203) is used to get the current location and the data posted to backend (200). Such data is posted from a number of in-vehicle phones (211.2, 211.3, 211.4, and 211.5). Finally, a fusion is run on the data which does a clustering on the location data associated with the scores to get an aggregated score which is then provided to the user using alerting/reporting service (219) as audible alerts and a pothole map of the city/region.

Similarly, the ITS (100) can be configured to develop many such sensor-based applications enabling real-time monitoring of anomalies in the vehicular transportation system using the suite of services bundled on the RIPSAC platform. For example, one or more sensors may help in monitoring end-user vehicular driving such as acceleration and deceleration habits, driver's alertness, etc. that may be utilized by the insurance companies for deciding the insurance premium and risk cover. Further, data collected by sensors located within the vehicle can be used to determine dynamic risk factors and help in accident avoidance, thereby reducing claims and exposure for the insurance company while in turn lowering premiums for the end user. Data collected by the sensors enable dynamic traffic control at a city level by collecting data about road conditions, vehicular density, etc. that when used in conjunction with GPS navigation will enable dynamic scheduling that can reduce bottlenecks and optimize commute time for all drivers.

In an exemplary embodiment, the platform would enable real-time editing of Word and PowerPoint documents within a car by a passenger through a visual interface or audio-based interface. In yet another exemplary embodiment, the platform enables real-time tracking of customer behavior and habits. The tracked behaviors are then utilized for advertising by the advertisers to occupants of the car, taking into account the role of the subject of advertising in the car. For example, for the occupant driving the car, the advertisers would target the occupant with audio advertisements and for the occupants in the back-seats would be targeted with visual advertisements. For both of the cases, the advertisements would be related to products or services that are related to tracked behaviors of all the occupants.

In an exemplary embodiment, the integration of the hardware and software platform enable multiple passengers in the same vehicle to perform various tasks associated with business, entertainment, and communication they currently perform in the home or office. For example, the integrated platform allows lawyers to work on legal documents in the car while they are sitting in the passenger seat, children to do homework or play video games while they are riding in the back seat, insurance companies to monitor driver behavior in real time, and law enforcement officials to monitor drunk driving rules while a driver is driving the car. The various services and applications supported by the platform are as follows:

In an exemplary embodiment, the ITS (100) is configured to enable tracking behavior of the occupants in the vehicle using the suite of sensor, storage, analytics services bundled in the RIPSAC platform. The application involves the use of sensor observations, both present as well as past observations to learn the behavior of the occupants of the vehicle. This would include the driving habits of the driver and the actions/activities of the driver as well as other passengers. Methods and devices for monitoring the cardiac activity of a driver is known in the art. In one example, a device wirelessly transmits the recorded electrocardiogram readings to a remote communication device(s). Activities other than driving include use of in-car entertainment systems, connected computers, vehicle controls and consumption of content using in-car systems. Using learnt behavior, occupants and their actions can be detected and tracked in real-time. This provides rich contextual information that can be used for variety of application including delivery of customized content, information and advertisement to occupants.

In an exemplary embodiment, the ITS (100) is configured to enable the In-vehicle anomaly detection using the suite of sensor, storage, analytics services bundled in the RIPSAC platform. In this exemplary embodiment, the In-vehicle anomaly detection involves monitoring and surveillance of the vehicle. The anomaly includes combined analytic output of a class of sensors. For example, an anomaly may include detection of any unexpected movement, unexpected sounds or even a sudden change in cabin temperature or light conditions of the vehicle. The major application of the anomaly tracking is to generate an alert based on the results of monitoring rather than a constant and continuous manual monitoring. The pattern matching, exception detection, movement detection and sound matching algorithms receives inputs from devices in vehicle such as cabin camera, cabin microphone, cabin-climate detection and notification devices to detect any unexpected conditions inside the vehicle. The In-vehicle anomaly further includes tracking in-cabin environment conditions by analyzing the parameters such as temperature, humidity, and thermostat etc. This can be considered to be a measure of climate control being used within the vehicles. The data is valuable since it allows the vehicle to auto adjust to the conditions based on the driver's preferences.

In an exemplary embodiment, the ITS (100) is configured to enable diagnosis of the vehicular components using the suite of sensor, storage, analytics services bundled in the RIPSAC platform. Diagnostics involves analysis of fuels levels, battery-capacity, Oxygen level, and accelerometer readings on the dashboard in order to ensure the vehicle safety and reliability in various different environmental conditions. These reading are sensed by different sensors such as dashboard sensor, accelerometer sensor and other sensors monitoring engine, transmission and other subsystems. The values obtained from the sensors are analyzed using estimation and efficiency calculation algorithms. The output of the diagnostics tracking is to track or monitor the health of the vehicle and the possible problem areas in functioning of different engine parts of the vehicle in order to avoid possible accidents. Further, a logging and tracing report can be generated at backend while the diagnostics tracking is in progress at vehicle premises providing detail activity report of the diagnostics data. Ways of capturing sensing data from vehicle sensors for diagnosis and prognosis thereof may be known to those in the art.

In an exemplary embodiment, the ITS (100) is configured to enable E-CALL Service from the remote vehicle using the suite of sensor, storage, analytics services bundled in the RIPSAC platform. The E-call is a service that allows a driver or a passenger to make an emergency call from the vehicle. The use of Telematics can be important in scenarios where cellular coverage may be hampered. Further, it may be vital in case the user does not have a cell phone which may have also got damaged during an accident. E-Call utilizes distress lines to make calls to emergency services and also automatically ask for help in case the passengers fail to respond. The purpose of the E-CALL is the detection of a disaster and making a call and to route the call using any available connectivity.

In an exemplary embodiment, the ITS (100) is configured to enable Region-based Tracking Service from the remote vehicle using the suite of sensor, storage, analytics services bundled in the RIPSAC platform. The region-based tracking involves tracking of vehicular information related to number of vehicles located in one specific region. This can be referred to an aggregated location-based service wherein the region based motion detection of multiple vehicles along with the traffic density is tracked for that particular region being monitored.

In an exemplary embodiment, the ITS (100) is configured to enable the post to ITS (Intelligent Transport System) Telematics service that allows posting of vehicle sensor data to the transportation system for better traffic management. This service shall allow one time and periodic posting of vehicle data to the ITS. All the telematics analytics data sensed by different sensors in the vehicle is posted to the ITS for traffic management.

In an exemplary embodiment, the ITS (100) is configured to enable Citizen Sensor/Participatory Sensing service that involve active participation of citizens acting as citizen sensors those observe hazardous situations in a particular area such as crimes, natural calamities etc. and report these observations in the form of audio or text data to the concerned authorities using their handheld devices. Since there may be wide variety of events that can be reported with varied skill levels of people, a standardized format for reporting is difficult. Therefore, a semantic analysis of citizen report data is implemented using NLP based algorithm for extract relevant information. Further the ITS platform also support mechanisms for rewarding contributors based on relevance and trustworthiness of the data. In an exemplary embodiment, the various services as disclosed above are used for implementation of various real-time vehicular applications that are associated with the vehicle tracking and traffic management. Few of the applications are as follows:

In an exemplary embodiment, the ITS (100) with the support of RIPSAC platform enables development of Car Black-box application. Analogues to aeroplane's black-box, this application is responsible for sensing different parameters of the vehicle using in-built sensors. This application is utilized to remotely monitor the health status and thereby diagnostics of the vehicle. Further, this application is utilized to monitor the driver's driving habits in order to help physician and the insurance companies to perform post-accident tasks based on the monitored results.

In an exemplary embodiment, the present disclosure enables the ITS platform (100) to locate different users driving their vehicles in a real-time. For example, the ITS platform (100) monitors the driving details such as route map and time of day etc. by sensing the location data of the vehicles of the participating users. Based on this analysis, a social graph is generated in real-time containing possible users driving their vehicles in a particular area.

In an exemplary embodiment, the ITS platform (100) using the suite of bundled sensor, analytics and storage services plays a vital role in helping the insurance companies decide risk cover and premium amount for different individuals based on their driving habits. For example, real-time capturing of driving characteristics such as traffic level, time of driving, type of roads frequently travelled, travelling distance may be analyzed to determine the risk associated with accident. Further, based on observed traffic characteristics for each of the individuals, the premium amount and risk cover can be decided so that both the insurance provider and the insured individual are benefited. In an exemplary embodiment, the edge platform in the vehicle comprising different sensors can quickly and efficiently assists with managing the insurance claims process. For example, from the accelerometer sensor data, the driving pattern of the driver and a crash can be detected. From the timestamps, the driving time and the time when actually the incident occurred can be detected. Faster the insurance company comes to know of the accident, claim amount will be less. In an exemplary embodiment, the traffic characteristics are monitored in real-time based on analysis of inputs from motion, location, time and diagnostic sensors. The analytics of the traffic details enable insurance provider to detect accidents quickly in order to receive less amount of claims. On the other hand, if the driver is a safe driver with good driving habits, he or she is eligible to pay fewer premiums for the insurance amount covered. These analytics enable reduction in fraud claims and the insurance provider is able to monitor various characteristics of the vehicle, the vehicle driver in real-time.

In an exemplary embodiment, the ITS (100) can be implemented as a remote vehicle surveillance system. There is a high possibility of unauthorized intrusion or thefts of the vehicle. In order to avoid such mishaps, the remote surveillance system enables real-time monitoring of the activities in the vehicle from remote location by way of displaying the in-cabin panoramic view of the vehicle on the Smartphone of the owner of the vehicle.

In an exemplary embodiment, the ITS (100) can be implemented to develop an automated safety alert application using the suite of RIPSAC services. Often, the reason of accidents and mishaps is that the drivers seem to overlook or neglect the safety signs and or traffic signs. Also sometimes proximity to other vehicles around a corner or a sharp bend is not accounted for by drivers. In these scenarios, an audible or visual alert to the driver regarding the ignorance of safety norms can be life-saving. In an exemplary embodiment, the present disclosure enables such alerts by providing proximity sensors and notification actuators into the traffic signals and road-signs. Further, execution of aggregated localized analytics on vehicle motion provides details regarding proximity and extrapolation predicting collisions on the road. These details are then analyzed in real-time which is then can be used to generate alerts. Further, the current bad road conditions related information without any indications in the form of sign-board can be gathered from different mobile users using crowd sourcing and this information is disseminated to the drivers by way of real time generated notification alert.

In an exemplary embodiment, the ITS (100) with the support of RIPSAC service suite is configured to develop and deploy traffic guidance application. Rush hour traffic management is a major concern for any city administrative body. Also in case of breakdown and blockage especially in hilly terrain, the risk free traffic diversion becomes a major concern due to the limited availability of roads and their limited capacity. Further, in case of a disaster, one major concern of post-disaster management is evacuation. Here, due to the large volume of traffic from a particular source leads to the problem of congestion and panic. Therefore, a proper traffic management and thereby traffic shaping is required. According to an exemplary embodiment, the traffic shaping depends on major criterion such as identification of congestion or breakdown or blockage, an appropriate sizing and causal analysis of the problem, routing of emergency services and routing of normal traffic. In an embodiment, identification of a possible bottleneck is performed through analysis of the region based vehicle density to generate emergency notifications. The possible reasons for traffic congestion may be due to social event or procession, natural calamities or disaster, and accidents such as bride/tunnel outage etc. After identification of the problem, there are two major action items, to route the emergency services through the fastest path possible and then lead the people to their destination quickly and safely. These two are conflicting and dependent requirements which require intelligent traffic shaping. As a result of traffic shaping, traffic congestion can be avoided, emergency services can be provided on time and smooth evacuations can be efficiently managed by the concerned authorities.

In an exemplary embodiment, the ITS (100) with the support of RIPSAC service suite is configured to develop and deploy Rogue Driver Detection. In an exemplary embodiment, the present disclosure enables real-time detection of rouge driver based on the driving habits of the drivers. Ways of detecting rough driving and accordingly rough vehicle thereof may be known in the art. If the telematics device installed in the vehicle is tampered or de-activated by a driver in order to escape its driving habits being tracked, the reports are generated based on text or audio received from the individuals driving in the same region.

In an exemplary embodiment, the ITS (100) with the support of RIPSAC service suite is configured to develop and deploy a method and system of transmitting information from source device to destination by means of audio commands embedded in the vehicular horn. One way of such implementation may include broadcasting audio information via a smart horn embedded in the vehicle which is interpreted by the application installed at the receiving station in order to take further steps. Further, the ITS (100) with the support of RIPSAC service suite is configured for managing unmanned Railway check posts. Ways of managing unmanned railway check posts may be known within the art, such as when a train is in proximity of an unmanned level crossing the system notifies all the mobiles in the vicinity of said level crossing.

In an exemplary embodiment, the ITS (100) with the support of RIPSAC service suite is configured to develop and deploy a method and system for damage assessment of object. Ways of such assessment may include assessing damage of an object by converting the visual data of the object into Multi-Dimensional (MD) representation and by identifying a set of characteristic points and a set of contour maps from the said MD representation of the object.

In an exemplary embodiment, the ITS (100) with the support of RIPSAC service suite is configured to develop and deploy an application of tourist guidance and navigation thereof. One way of facilitating such tourist guidance and navigation may include using tourist information is embedded in an encoded metadata at the source station which is retrieved by accessing a web link received along with encoded metadata at the destination station. Further, in another exemplary embodiment, the ITS (100) is configured for determining fatigue time of an activity in the vehicle. One way of determining fatigue time of an activity may include determining actual fatigue time (AFT) for an activity based upon received standard fatigue time (SFT) and a fatigue index corresponding to one or more external parameters.

In an exemplary embodiment, the present disclosure supports real-time context based advertising based on data collected by various sensors deployed in the vehicle premises. For example, in this embodiment, real-time monitoring of customer behaviors and habits is implemented utilizing various sensor devices. These monitored behaviors and habits of the customer are used for context-based advertising by advertisers to occupants of a car, taking into account the role of the subject of advertising in the car. For example, if the customer in the car is a driver, he or she will be targeted with audio advertisements in the front seat relevant to his or her profile. If the customer is a backseat passenger, then he or she will be targeted with video advertisements in the back-seat. Thus, the context-based advertising in accordance to this exemplary embodiment supports regulatory requirements (e.g. audio advertisements in the front seat and video advertisements in the backseat). In yet another exemplary embodiment, the context-based advertising includes real-time generation of user-specific profiles based on tracked telematics data inside the vehicle. Based on the generated profiles, each individual user will be targeted with advertisements from different advertisers in context to the user-specific profile. More specifically, multiple users will be targeted.

Figure 3:
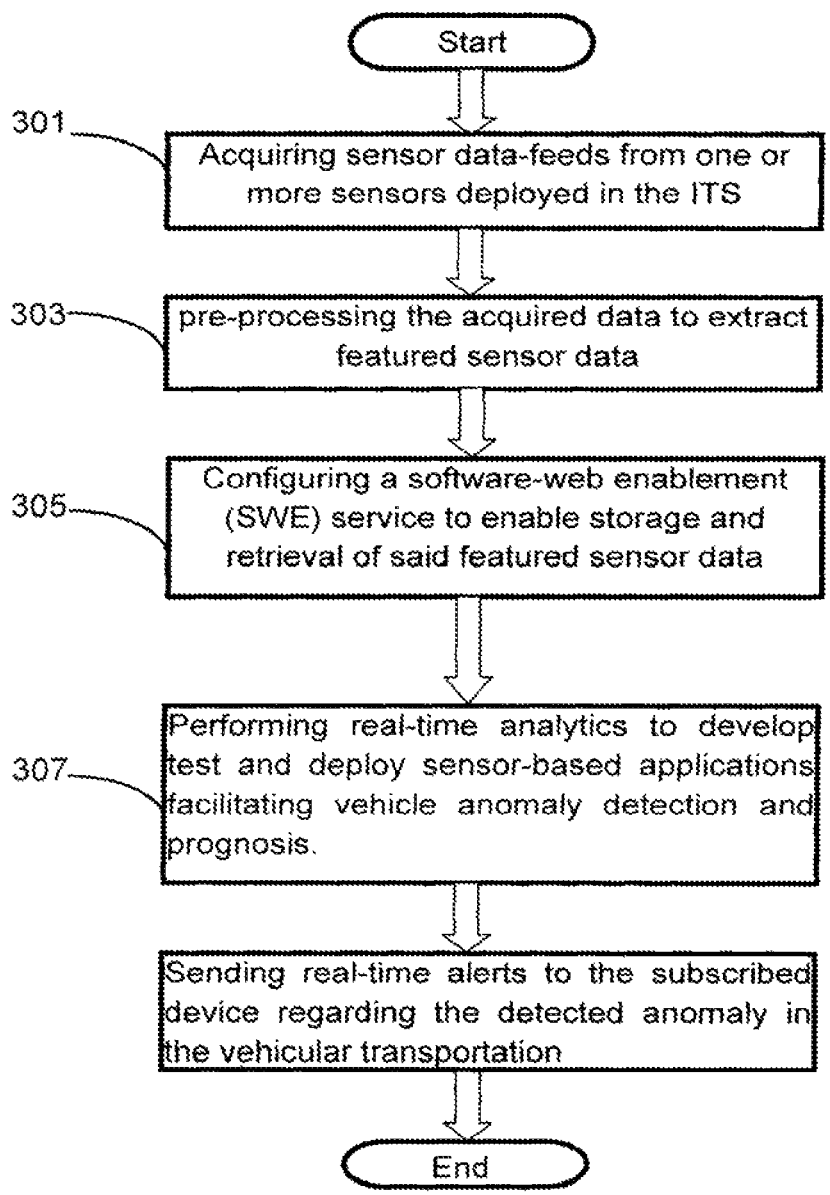
FIG. 3 is a flow diagram illustrating steps designed to enable the ITS platform with support of the platform services to perform the task of real-time analytics of a vehicular transportation according to an exemplary embodiment.

Referring to FIG. 3 is a flow diagram illustrating steps designed to enable the ITS platform with support of the RIPSAC services to perform the task of real-time analytics of a vehicular transportation according to an exemplary embodiment At step 301, sensor data-feeds in assorted formats from one or more sensors deployed at the proximity of vehicles is acquired.

At step 303, the acquired sensor-based data is pre-processed to exclude raw data and extract featured sensor data therefrom essential for anomaly detection.

At step 305, a software-web enablement (SWE) service is enabled for storage and retrieval of said featured sensor data.

At step 307, a set-of bundled analytics services and algorithms in the RIPSAC is utilized to develop, test and deploy one or more sensor-based applications facilitating vehicle anomaly detection and prognosis.

At step 309, real-time alerts or visualizations are sent to the subscribed device regarding the detected anomaly in the vehicular transportation.

The preceding description has been presented with reference to various embodiments of the disclosure. Persons skilled in the art and technology to which this disclosure pertains will appreciate that alterations and changes in the described structures and methods of operation can be practiced without meaningfully departing from the principle, spirit and scope of this disclosure.

Exemplary embodiments discussed above may provide certain advantages. Though not required to practice aspects of the disclosure, these advantages may include those provided by the following features.

The present disclosure enables Intelligent Transportation Service (ITS) platform that incorporates a suite of services focused on Safety and Security for the vehicle, driver, passengers and other road users.

The proposed ITS allow application developers to select a service and an appropriate algorithm thereof from a set of algorithms best suited for the domain.

The ITS allows application developers to test their algorithms with some test data from the platform.

The ITS on the RIPSAC is flexible to allow for development of new algorithms and plug-in these in the platform for future developments in same domain.

The present disclosure enables advertisers to target potential customers based on real-time analytics data that analyzes the user habits or behaviors.

The invention claimed is:

1. An intelligent transportation system comprising:
an infrastructure cloud computing platform comprising a plurality of hardware and software components, a plurality of infrastructure services, a plurality of Application Program Interfaces (APIs), and a plurality of Software Development Kits (SDKs),
   wherein the plurality of infrastructure services comprises a sensing service and at least one of an edge analytics service, a backend storage service, a backend analytics service, and a reporting service and are capable of executing algorithms, functions and calls required for developing a suite of sensor driven applications;
a plurality of sensors intermittently and remotely connected with the infrastructure cloud computing platform using a communication network,
   wherein the plurality of sensors are is capable of transmitting sensor data feeds to the infrastructure cloud computing platform where the suite of sensor driven applications are to be developed corresponding to the sensor data feeds,
   wherein the sensor data feeds is obtained in various formats from one or more sensors deployed at the proximity of vehicles, and
   wherein the edge analytics service is adapted to perform analytics on the sensor data feeds using preprocessing and feature extraction, wherein preprocessing and feature extraction leads to data reduction to allow storage of the features extracted from the sensor data feeds; and
a vehicle telemetry application development device electronically coupled with the infrastructure cloud computing platform and the plurality of sensors,
   wherein the vehicle telemetry application development device enables an application developer to invoke a plurality of services and computing algorithms therefrom using the APIs and SDKs to develop the suite of sensor driven applications in the infrastructure cloud computing platform,
   wherein the vehicle telemetry application development device facilitates the development of the suite of sensor driven applications by:
      enabling a plurality of application developers to select services and algorithms relevant in context with domain of the suite of sensor driven applications to be developed thereof; and
      enabling the plurality of application developers to develop a plurality of new sensor driven applications and algorithms of the plurality of new sensor driven applications using at least one selected service from the plurality of infrastructure services and adding the plurality of new sensor driven applications and algorithms of the plurality of new sensor driven applications to the suite of sensor driven applications.

2. The system of claim 1, wherein the plurality of hardware components comprise at least one of: computer machines, virtual machines, servers, disks, and network resources.

3. The system of claim 1, wherein the backend storage service is configured to enable storage and retrieval of sensor data using a Sensor Observation Service.

4. The system of claim 1, wherein the backend analytics service is configured for performing analytics on a back-end subsystem, wherein the back-end subsystem enables classification and clustering of the stored sensor data.

5. The system of claim 1, wherein the reporting service is adapted to provide audio/visual alerts to a plurality of end user subscribers based on a result of a plurality of analytics run on the sensor data.

6. The system of claim 1, wherein the plurality of sensors re is adapted to sense varied physical quantities in a smart vehicle environment, wherein the varied physical quantities further comprise at least one of temperature, pressure, location, motion, orientation, acceleration, deceleration, and cardiac data.

7. The system of claim 1, wherein said vehicle telemetry applications further comprise at least one of: pot-hole detection, rough-vehicle detection, cardiac-activity monitoring, in-car diagnostic and prognosis thereof, remote-photography, remote tourist guidance, driver-drowsiness identification, remote sFurstp-detection, remote damage assessment, managing unmanned railway-check posts, and remote vehicle communication.

8. The system of claim 1, wherein the plurality of sensors integrated with the infrastructure cloud computing platform comprise at least one of soft sensors, physical sensors, and virtual sensors.

9. The system of claim 1, wherein the sensing service is configured to provide sensor data feeds from a device equipped with an array of sensors.

10. The system of claim 9, the sensor data feeds are captured through at least one of: on-board/off-board vehicular sensors, smartphones, proximity sensor gateway devices and intelligent sensing devices.

11. A method for providing an intelligent transportation platform, the method comprising:
integrating a plurality of infrastructure services on a cloud computing platform,
   wherein the plurality of infrastructure services comprises a sensing service and at least one of an edge analytics service, a backend storage service, a backend analytics service, and a reporting service and are capable of executing algorithms, functions and calls to develop a suite of sensor driven applications for sensor data feeds received from a plurality of sensors, wherein the plurality of sensors are intermittently and remotely connected with the cloud computing platform through a communication network, and wherein the sensor data comprises feeds from various on-board/off-board vehicle sensors, wherein the sensor data feeds is obtained in various formats from one or more sensors deployed at the proximity of vehicles, and wherein the edge analytics service performing analytics on the sensor data feeds using preprocessing and feature extraction, thereby leading to data reduction and allowing for storage of the features extracted from the sensor data feeds and not allowing for storage of raw sensor data;

facilitating a plurality of application developers for developing the suite of sensor driven applications by means of a vehicle telemetry application development service, wherein the vehicle telemetry application development service is electronically coupled to the plurality of infrastructure services and the plurality of sensors;

enabling the plurality of application developers to access the infrastructure services on the cloud computing platform for developing the suite of sensor driven applications in the infrastructure cloud computing platform by means of the vehicle telemetry application development service, wherein the suite of sensor driven applications further comprises vehicle telemetry applications;

enabling the plurality of application developers to select services and algorithms relevant in context with a domain the suite of sensor driven applications to be developed thereof; and enabling the plurality of application developers to develop a plurality of new sensor driven applications and algorithms of the plurality of new sensor driven applications using at least one selected service from the plurality of infrastructure services and adding the plurality of new sensor driven applications and algorithms of the plurality of new sensor driven applications to the suite of sensor driven applications.

12. The method of claim 11, wherein the plurality of sensors sense varied physical quantities in a smart vehicle environment, wherein the varied physical quantities comprise at least one of: temperature, pressure, location, motion, orientation, acceleration, deceleration, and cardiac data.

13. The method of claim 11, wherein the plurality of infrastructure services comprises the backend storage service enabling storage and retrieval of sensor data using a Sensor Observation Service.

14. The method of claim 11, wherein the plurality of infrastructure services comprises the backend analytics service performing analytics on a back-end subsystem, thereby enabling classification, and clustering of the stored sensor data.

15. The method of claim 11, wherein the plurality of infrastructure services comprises the reporting service providing audio/visual alerts to a plurality of end-user subscribers based on at least one result of an analytics run on the sensor data.

16. The method of claim 11, wherein the sensor data feeds are captured through at least one of: on-board/off-board vehicular sensors, smartphones, proximity sensor gateway devices and intelligent sensing devices.

17. The method of claim 11, wherein the suite of sensor driven applications facilitates vehicle anomaly detection and a prognosis of the vehicle anomaly detection, wherein the suite of sensor driven applications is focused to enable safety and security for at least one of: a vehicle, a driver, a passenger, and another road user.

18. The method of claim 11, wherein the algorithms, the functions and the calls are executed depending on a nature of service selected and a context of a sensor driven application provided to be developed, test and deployed.

* * * * *